June 3, 1930.  H. A. DENMIRE  1,762,131
WATCHCASE HEATER
Filed April 21, 1927  3 Sheets-Sheet 1

INVENTOR
*Harold A. Denmire.*
BY
*Evans & McCoy*
ATTORNEYS

June 3, 1930.  H. A. DENMIRE  1,762,131
WATCHCASE HEATER
Filed April 21, 1927  3 Sheets-Sheet 2

INVENTOR
Harold A. Denmire
BY Evans & McCoy
ATTORNEYS

Patented June 3, 1930

1,762,131

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

WATCHCASE HEATER

Application filed April 21, 1927. Serial No. 185,468.

This invention relates to a heater for vulcanizing or curing articles under heat and pressure and it particularly pertains to an improved form of watch case heater primarily intended for use in the curing or vulcanizing of articles of rubber composition.

Vulcanizing heaters heretofore proposed empolyed a supplmental source of pressure that is independent of the heating fluid for closing the mold structure.

One of the objects of the invention is to provide closing mechanism for the heater that is actuated by the pressure of fluid used to heat the mold units.

Another object of the invention is to provide a steam operated watch case heater having a piston of sufficient effective area to overcome the internal expansion pressure of inner tubes and tire casings to be cured therein by utilizing the pressure of the steam or other heating fluid for opening or for both opening and closing the mold structure.

An additional object of this invention is to provide a mold structure for curing and molding articles under heat and pressure wherein the heating fluid also imposes the closing pressure for the mold structure.

Another object of the invention is to provide a fluid heated watch case mold for curing annular articles that utilizes the heating medium to maintain the mold closed during the vulcanizing process.

An additional object of the invention is to provide a very rapidly operating molding unit for curing rubber composition or other articles subjected to heat and pressure.

Applicant's copending application Serial No. 139,485 filed October 4, 1926 contains claims that are generic to the construction shown in this application.

A preferred embodiment of the present invention is illustrated in the accompanying drawings wherein.

Figure 1:
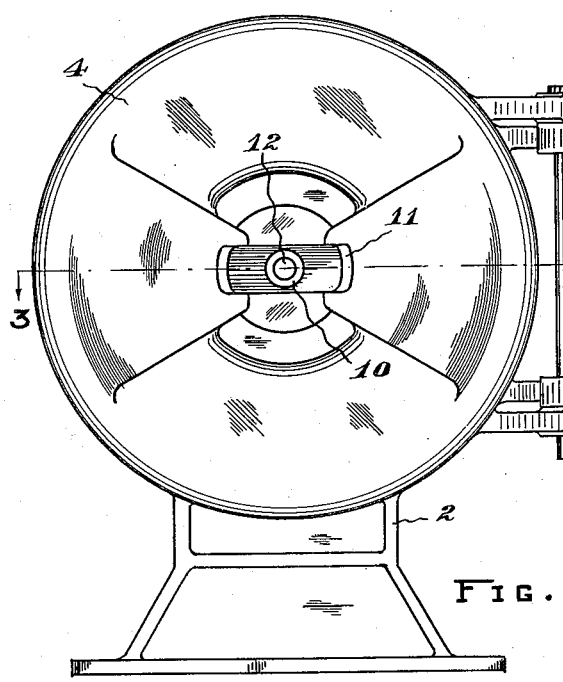
Figure 1 is a front view shown in elevation of a heater constructed in accordance with this invention.

The watch case heater shown in the accompanying drawings comprises a heater body 1 that has a suitable supporting pedestal 2 and a pair of heater doors 3 and 4 hinged to the body by suitable pintles 5 of conventional form.

The body 1 of the heater has a pair of opposed cylinders 6 and 7 formed therein that are separated in this embodiment of the invention by a wall 8. A single cylinder may also be used for both pistons as set forth in my prior application Serial No. 139,485 that was filed October 4, 1926 and entitled "Watch case heater." Each cylinder has a reciprocating piston 9 mounted therein for applying closing pressure to the corresponding heater door through a connecting rod 10 and a swivel block 11 that serves to releasably connect the piston with the corresponding door of the heater.

In order to suitably support the piston, a shaft 12 that is secured in the partition or spider 8 is extended through the hollow piston rod 10. A packing gland 13 of any desired conventional form is carried by the face plate 14 of the heater body which also constitutes a cylinder head. The face plate 14 is connected to the heater body by a plurality of bolts 15 and has a series of radial ribs 16 that connect the portion of the head or plate in which the packing gland 13 is mounted with the outer rim of the head. A mold shell 17 is also carried by the face plate and is held in place by suitable bolts 18 in accordance with conventional practice. It will be obvious that the mold shell may be formed integral with the cylinder head if such is desired. By providing removable mold shells, changes in the size or marking of the mold cavity may be made from time to time. A corresponding mold shell 19 is also carried by each of the heater doors 3 and 4, which are so formed as to provide a steam cavity 20 by means of which the corresponding mold shell is heated.

Each of the pistons 9 has suitable packing 21 for preventing undesirable leakage of the actuating medium between the piston and the cylinder. A suitable duct 22 is provided in the heater body for admitting fluid pressure to the rear face of the piston in order to move the piston outwardly a sufficient distance to permit ready manipulation of the swivel closing block 11 when the heater is opened or closed. This pressure may either be provided by steam that is released from the cavity 23 of the other mold unit of the heater or it may be fluid pressure from some other source. A suitable duct 24 supplies steam between the cylinder head 14 and the face of the piston. This heating fluid serves to heat the mold shell carried by the cylinder head.

Figure 2:
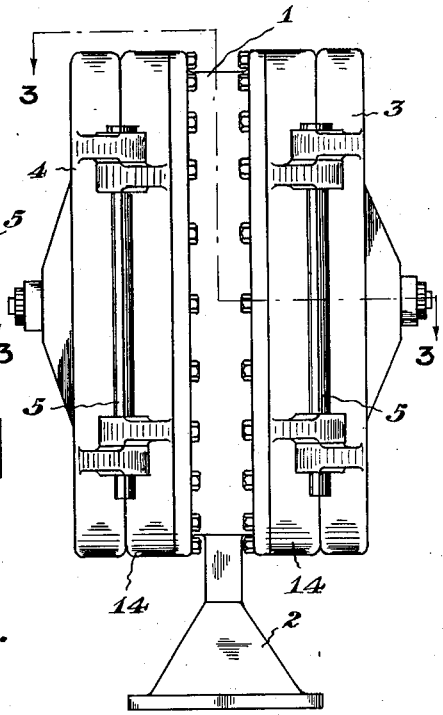
Fig. 2 is a side elevational view of the heater shown in Fig. 1.
Figure 3:
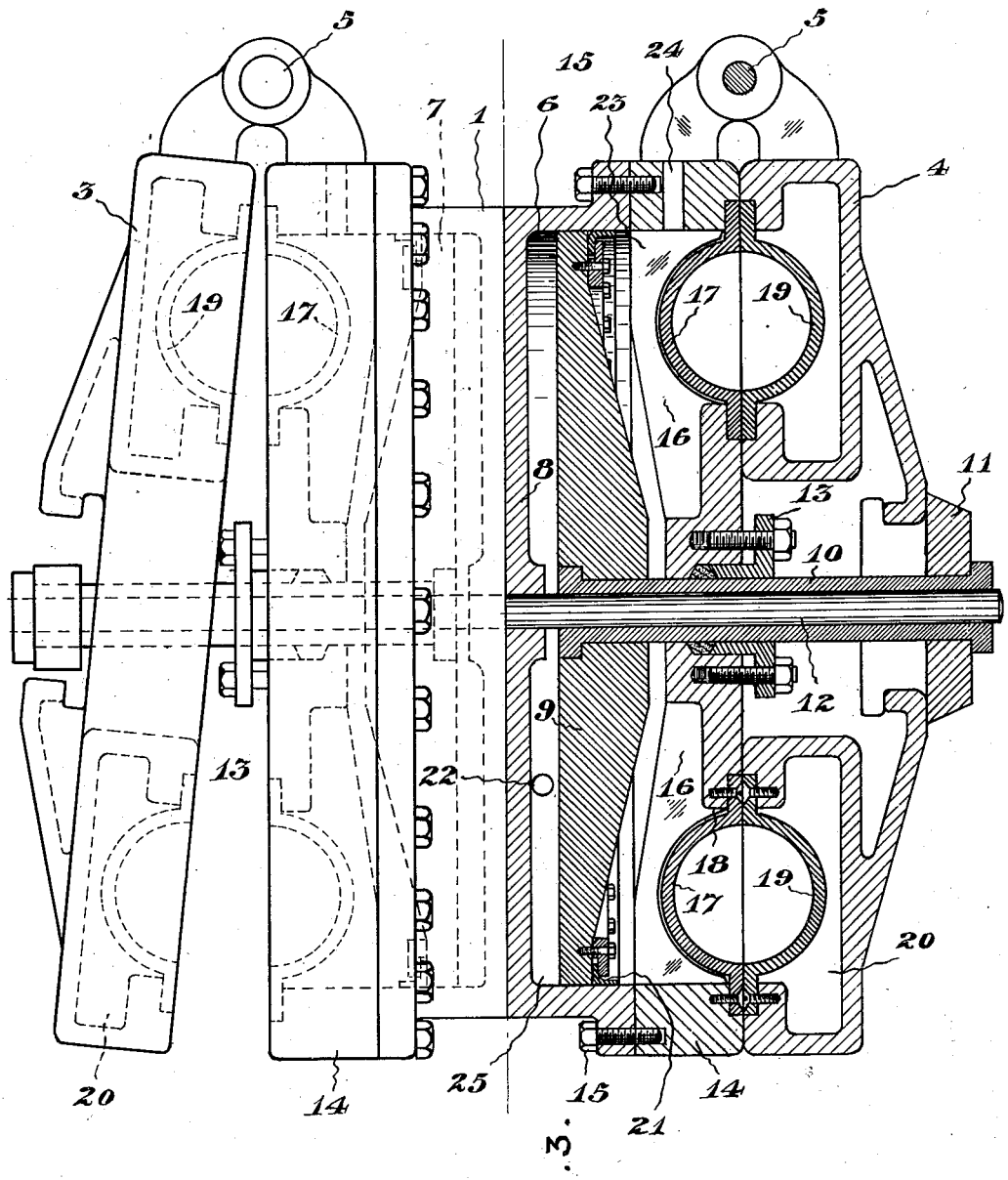
Fig. 3 is an enlarged top plan view shown partially in section on lines 3—3 of Fig. 1 and Fig. 2.

The operation of the heater shown in Fig. 1, Fig. 2 and Fig. 3 is substantially as follows:

After the article to be molded is placed within the molding cavity defined by molding shells 17 and 19, the door of the heater is closed and the pivoted block 11 is turned on the piston rod 10 to connect the piston 9 with the door of the heater. Steam or other heating fluid is then introduced into the cavity 23 through the duct 24 and the pressure of this steam or other heating fluid acts upon the piston 9 to close the molding cavity with great pressure. After the molding cavity is closed the object contained therein, if it be an inflatable object, has internal pressure applied thereto to force it into intimate contact with the molding shells 17 and 19.

After the article that is contained in the molding cavity is vulcanized or cured, the pressure from the steam cavity 23 is released and the piston is moved outwardly by introducing fluid pressure into the cavity 25 between the back of the piston and the closing partition 8 of the cylinder. This moves the piston outwardly and permits ready manipulation of the closing block 11, thereby releasing the door of the heater. The heater door is then swung open and the article being vulcanized is removed from the cavity and replaced by another article and the process continued.

Figure 4:
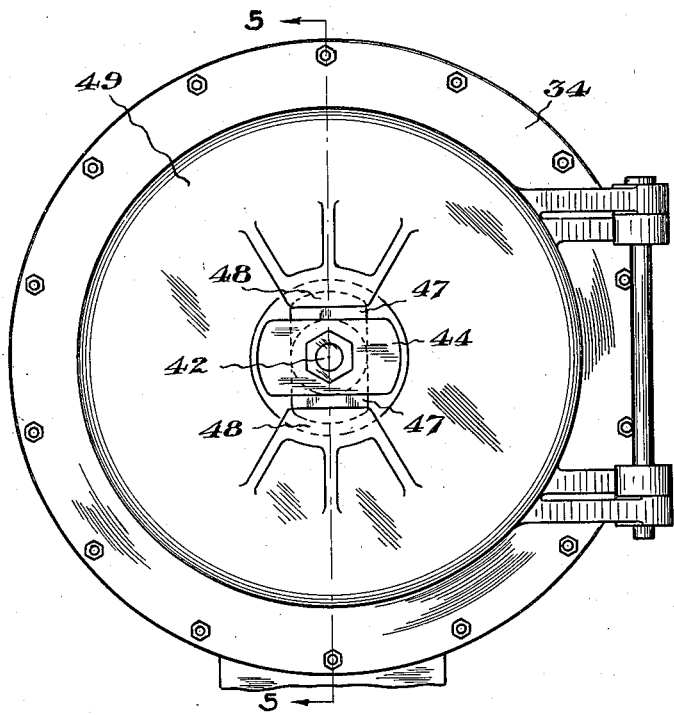
Fig. 4 is a face view of a modified form of watch case heater constructed in accordance with the invention.
Figure 5:
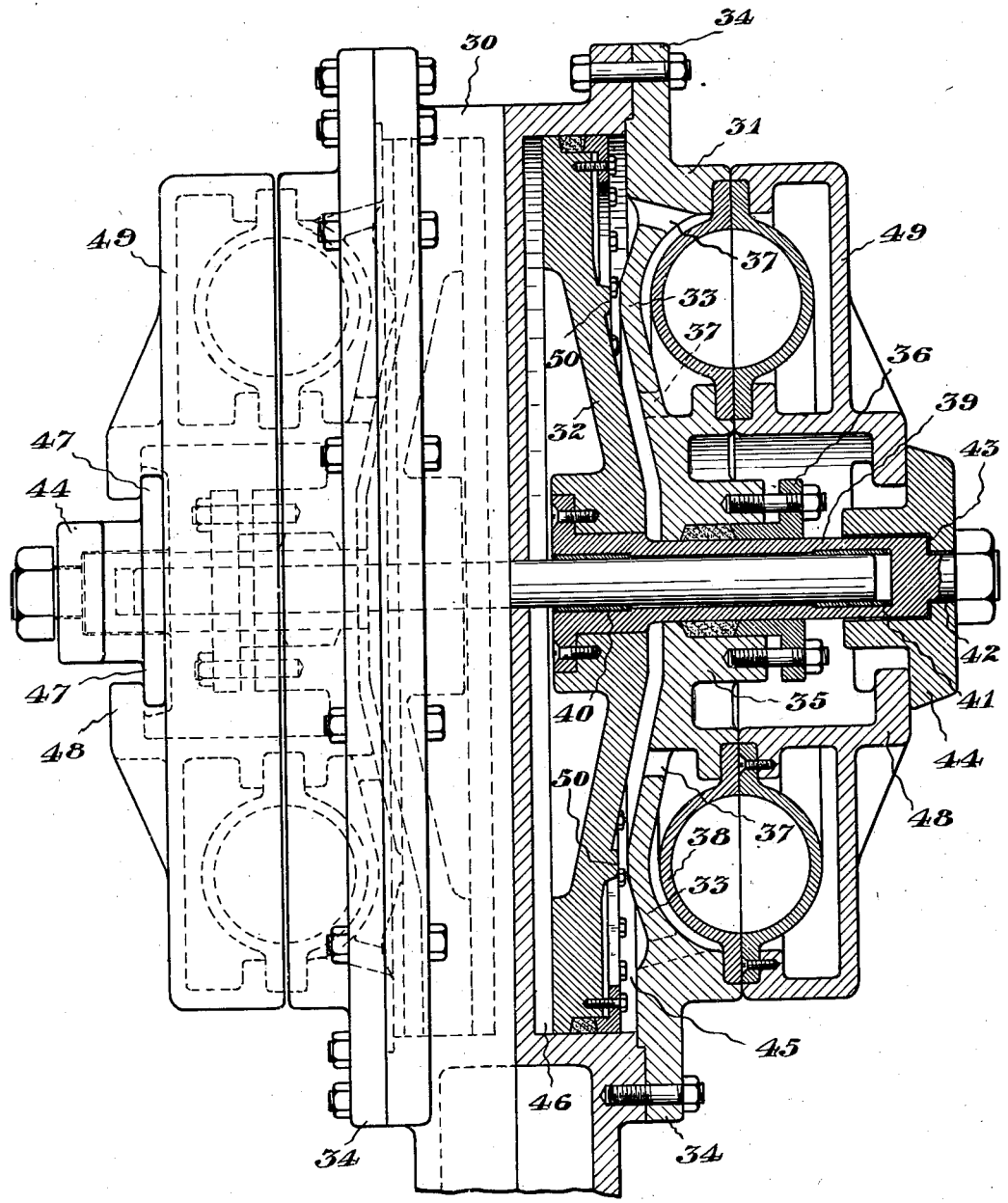
Fig. 5 is an enlarged side elevational view shown partially in section on line 5—5 of Fig. 4.

A modified application of the principles of the invention is shown in Fig. 4 and Fig. 5 wherein the heater body 30 has a corresponding piston and cylinder arrangement. The steam cavity between the piston head 31 and the piston 32 is greatly reduced in capacity in order to conserve steam or other heating fluid that is used to operate the device. In this form of the invention the piston head has a disc 33 that connects the outer rim 34 of the head with the portion 35 thereof that carries the packing gland 36. This disc has a series of apertures 37 extending therethrough that permit the steam to contact with the mold shell 38 in order to deliver heat directly thereto.

The piston rod 39 of this form of heater has suitable bearings 40 and 41 that assist in aligning the piston 32 with the cylinder. The outer end portion 42 of the connecting rod has a suitable shoulder 43 formed thereon for imposing breaking pressure on the closing block 44 when the piston is reversed to thereby open the mold when steam is exhausted from the pressure cavity 45 of the other mold unit to the cavity 46 in back of the piston or when opening pressure from any desired source is applied to the piston 32. In order to provide the desired interlocking of the mold door with the closing block 44, the closing block is provided with a pair of outstanding arms 47 that are formed to receive the lugs 48 formed on the doors 49 in order to apply mold breaking pressure directly from the piston to the door. After the mold is broken by the action of the piston, the block 44 corresponding to the molding cavity that is being opened is turned through 90° in order to release the door of the mold and permit the door to be swung open. The piston is provided with an annular gland 50 that engages a corresponding portion of the web 33 to prevent overtravel of the piston when the mold is being opened.

The increased speed with which a heater of this general character may be operated will be obvious to those skilled in the art. Both the closing and opening forces are developed by the piston when operated in different directions, the only effort required by the workmen being the opening of the door of the heater and the charging of the mold cavity with material to be cured.

What I claim is:

1. A watch case heater comprising a body having a cylinder therein, a reciprocating piston mounted in the cylinder, a cylinder head having a molding cavity formed therein in heat interchanging relation with respect to said cylinder, a door hinged to said body and adapted to close said molding cavity, and means extending through said head and releasably connecting said piston with said door for subjecting material within the cavity to molding pressure.

2. A watch case heater comprising a body having a cylinder therein, opposed pistons in the cylinder, a head for each end of said cylinder having a molding cavity therein, doors cooperating with each said molding cavities for closing the same, and means releasably connecting each piston with the corresponding door for applying closing pressure thereto.

3. A watch case heater comprising a body having a cylinder therein, a reciprocating piston mounted in the cylinder, a cylinder head, a door hinged to the body and having a heating cavity therein, a mold member carried by the cylinder head, a second mold member carried by the door, a piston rod extending from the piston through said head and means for releasably connecting the piston rod to the door when the same is closed whereby closing pressure may be applied to the door.

4. A watch case heater comprising a body having a cylinder therein, said cylinder having a head provided with a mold cavity in the outer face thereof, a piston within the cylinder, a piston rod connected to said piston, a door hinged to the body and having a mold cavity therein adapted to mate with the mold cavity of the body, the piston rod extending from said piston through said head, means for releasably connecting the piston rod through the door when the door is in closed position and means for admitting fluid pressure to either side of the piston for imposing closing pressure on said door or for imposing opening pressure thereon.

5. A molding heater comprising a mold member having a pressure cylinder formed therein and a head having a molding cavity in the outer face thereof, a second mold member hinged to the first and having a molding cavity adapted to register with the molding cavity of the first member, a fluid operated piston mounted in the cylinder and adapted to be acted upon by heated fluid under pressure, a piston rod extending from the piston through the head, and means for releasably connecting said rod to said hinged mold member, the molding cavity being heated by the actuating fluid.

In testimony whereof I affix my signature.

HAROLD A. DENMIRE.